United States Patent [19]

Ohgizawa et al.

[11] Patent Number: 5,844,046
[45] Date of Patent: Dec. 1, 1998

[54] PROCESS FOR THE PREPARATION OF OLEFIN POLYMER

[75] Inventors: Masaaki Ohgizawa; Mamoru Kioka, both of Yamaguchi, Japan

[73] Assignee: Mitsui Petrochemical Industries, Ltd., Tokyo, Japan

[21] Appl. No.: 810,884

[22] Filed: Mar. 5, 1997

Related U.S. Application Data

[63] Continuation of Ser. No. 160,734, Dec. 3, 1993, abandoned.

[30] Foreign Application Priority Data

Dec. 4, 1992 [JP] Japan .................................. 4-325697
Dec. 4, 1992 [JP] Japan .................................. 4-325698

[51] Int. Cl.$^6$ .................................................. C08F 297/08
[52] U.S. Cl. .......................... 525/270; 525/322; 525/247; 525/254; 526/125.3
[58] Field of Search .................................. 525/247, 254, 525/270, 322; 526/125.3

[56] References Cited

U.S. PATENT DOCUMENTS

| | | | |
|---|---|---|---|
| 4,547,552 | 10/1985 | Toyota et al. ........................... | 525/247 |
| 4,822,840 | 4/1989 | Kioka et al. ............................ | 525/240 |
| 5,023,223 | 6/1991 | Ebara et al. ............................ | 502/116 |
| 5,449,738 | 9/1995 | Koura et al. ........................... | 525/247 |
| 5,473,021 | 12/1995 | Koura et al. ........................... | 525/247 |

FOREIGN PATENT DOCUMENTS

0385765 5/1990 European Pat. Off. .
61-215613 9/1986 Japan .

*Primary Examiner*—Mark Nagumo
*Attorney, Agent, or Firm*—Sherman and Shalloway

[57] ABSTRACT

A process for preparing an olefin polymer comprising the steps of: preparing an olefin polymer [I] by polymerizing or copolymerizing an olefin in the presence of an olefin poymerization catalyst comprising a specific solid titanium catalyst component [A], a specific organoaluminum compound catalyst component [B] and a specific electron donor catalyst component [C]; preparing an olefin polymer [II] by polymerizing or copolymerizing an olefin in an polymerizer different from that for the polymerization of the above step in the presence of an olefin poymerization catalyst comprising a specific solid titanium catalyst component [A], a specific organoaluminum compound catalyst component [B] and a specific electron donor catalyst component [D]; and then allowing the resulting olefin polymer [I] and the resulting olefin polymer [II] to coexist in one polymerizer to further polymerize or copolymerize an olefin.

8 Claims, 2 Drawing Sheets

Fig. 2

PROCESS FOR THE PREPARATION OF OLEFIN POLYMER

This application is a continuation, of application Ser. No. 08/160,734, filed Dec. 3, 1993 abandoned.

FIELD OF THE INVENTION

The present invention relates to a process for preparing an olefin polymer, which is able to prepare an olefin polymer having a wide molecular weight distribution, good moldability and high stereoregularity in a high yield and which is able to easily regulate a molecular weight distribution of the resulting olefin polymer.

BACKGROUND OF THE INVENTION

With regard to a process for preparing a solid catalyst component containing magnesium, titanium, halogen and an electron donor as its essential components, many proposals have been heretofore made, and it is known that a polymer having high stereoregularity can be prepared in a high yield by using the solid catalyst component in the polymerization of an α-olefin having at least three carbon atoms.

In general, an olefin polymer obtained by using a highly active catalyst component carried on $MgCl_2$ shows excellent mechanical properties, but such polymer has a narrow molecular weight distribution and the moldability thereof is not always satisfactory. Hence, depending upon the application of polymers, an olefin polymer which easily flows in the melting stage, namely, an olefin polymer having good moldability, is desired.

On that account, the present inventors have disclosed the following olefin polymerization process in Japanese Patent Laid-Open Publication No. 7703/1991 (EPC Publication No. 385765). This process comprises polymerizing or copolymerizing an olefin in the presence of an olefin polymerization catalyst formed from:

[A] a solid titanium catalyst component containing magnesium, titanium, halogen and an electron donor as essential components,

[B] an organoaluminum compound catalyst component, and

[C] at least two kinds of electron donor catalyst components containing an electron donor (a) and an electron donor (b) (with the proviso that MFR (a) of a homopolypropylene obtained by using a catalyst comprising the solid titanium catalyst component [A], the organoaluminum catalyst component [B], and the electron donor (a) and MFR (b) of a homopolypropylene obtained by using a catalyst comprising the solid titanium catalyst component [A], the organoaluminum catalyst component [B], and the electron donor (b) satisfy $\log[MFR(b)/MFR(a)] \geq 1.5$).

This olefin polymerization process can produce an olefin polymer having a particularly wide molecular weight distribution in a high yield. Moreover, the molecular weight distribution of the resulting polymer is widened, and also a polymer having extremely high molecular weight as is unobtainable in a conventional process is produced beyond expectation. Further, the olefin polymer obtained in this polymerization process shows high stereoregularity and high bulk density. In this process, an olefin polymer having a molecular weight distribution (Mw/Mn) of about 6~8 can be obtained, but desired now is an olefin polymer having a much wider molecular weight distribution.

The present inventors have earnestly studied to pursue a process for preparing an olefin polymer, which is able to prepare an olefin polymer having a wider molecular weight distribution and better moldability than the olefin polymer obtained by the above-mentioned process and which is able to easily regulate the molecular weight distribution of the resulting polymer. As a result, they have found that an olefin polymer having an extremely wide molecular weight distribution, good moldability and high stereoregularity can be obtained by a process comprising the steps of:

preparing an olefin polymer [I] by polymerizing or copolymerizing an olefin in the presence of an olefin poymerization catalyst formed from a specific solid titanium catalyst component, a specific organoaluminum compound catalyst component and a specific electron donor catalyst component; preparing an olefin polymer [II] by polymerizing or copolymerizing an olefin in an polymerizer different from that for the polymerization of the above step in the presence of an olefin poymerization catalyst comprising a specific solid titanium catalyst component, a specific organoaluminum compound catalyst component and a specific electron donor catalyst component; and then allowing to coexist the olefin polymer [I] and the olefin polymer [II] in one polymerizer to further polymerize or copolymerize an olefin. They have also found that a molded article produced from the olefin polymer prepared by this process is excellent in mechanical properties and transparency, and according to this process, a molecular weight distribution of the resulting polymer can be easily regulated.

Further, the present inventors have found that an olefin polymer having an extremely wide molecular weight distribution, good moldability and high stereoregularity can be obtained also by a process comprising the steps of: polymerizing or copolymerizing an olefin in the presence of an olefin polymerization catalyst comprising a specific solid titanium catalyst component, a specific organoaluminum compound catalyst component and a specific electron donor catalyst component: and then adding to the polymerization system a specific electron donor catalyst component which is different from the above-mentioned electron donor catalyst component so as to polymerize or copolymerize an olefin. They have also found that a molded article produced from the olefin polymer prepared by this process is excellent in mechanical properties and transparency, and according to this process, a molecular weight distribution of the resulting polymer can be easily regulated.

Thus, the present invention has been accomplished.

OBJECT OF THE INVENTION

It is, therefore, an object of the present invention to provide a process for preparing an olefin polymer, which is able to prepare an olefin polymer having an extremely wide molecular weight distribution and being excellent in moldability, mechanical properties, transparency and stereoregularity and which is able to regulate a molecular weight distribution of the resulting olefin polymer.

SUMMARY OF THE INVENTION

The first process for preparing an olefin polymer according to the present invention is a process for preparing an olefin polymer, comprising the steps of:

preparing an olefin polymer [I] by polymerizing or copolymerizing an olefin in the presence of an olefin polymerization catalyst comprising:

[A] a solid titanium catalyst component containing magnesium, titanium, halogen and an electron donor as essential components,

[B] an organoaluminum compound catalyst component, and

[C] an electron donor catalyst component represented by the following formula [I]:

$$R^1{}_2Si(OR^2)_2 \quad [I]$$

wherein $R^1$ is an alkyl, cycloalkyl, cycloalkenyl or aryl group whose carbon atom adjacent to Si is a secondary or tertiary carbon atom; and $R^2$ is a hydrocarbon group;

preparing an olefin polymer [II] by polymerizing or copolymerizing an olefin in a polymerizer different from that for the polymerization of the above step in the presence of an olefin poymerization catalyst comprising:

[A] a solid titanium catalyst component containing magnesium, titanium, halogen and an electron donor as essential components,

[B] an organoaluminum compound catalyst component, and

[D] an electron donor catalyst component represented by the following formula [II]:

$$R^1{}_nSi(OR^2)_{4-n} \quad [II]$$

wherein when n is 2, one of $R^1$ is an alkyl or alkenyl group whose carbon atom adjacent to Si is a primary carbon atom, and the other of $R^1$ is an aralkyl group whose carbon atom adjacent to Si is a primary carbon atom; when n is a number satisfying the condition of 0<n<2 or 2<n<4, $R^1$ is an alkyl or alkenyl group whose carbon atom adjacent to Si is a primary carbon atom; $R^2$ is a hydrocarbon group; and n is a number satisfying the condition of 0<n<4; and then allowing the resulting olefin polymer [I] and the resulting olefin polymer [II] to coexist in one polymerizer to further polymerize or copolymerize an olefin.

The second process for preparing an olefin polymer according to the present invention is a process for preparing an olefin polymer, comprising the steps of:

polymerizing or copolymerizing an olefin in the presence of an olefin polymerization catalyst comprising:

[A] a solid titanium catalyst component containing magnesium, titanium, halogen and an electron donor as essential components,

[B] an organoaluminum compound catalyst component, and

[C] an electron donor catalyst component represented by the following formula [I]:

$$R^1{}_2Si(OR^2)_2 \quad [I]$$

wherein $R^1$ is an alkyl, cycloalkyl, cycloalkenyl, or aryl group whose carbon atom adjacent to Si is a secondary or tertiary carbon atom; and $R^2$ is a hydrocarbon group; and then polymerizing or copolymerizing an olefin with addition of:

[D] an electron donor catalyst component represented by the following formula [II]:

$$R^1{}_nSi(OR^2)_{4-n} \quad [II]$$

wherein when n is 2, one of $R^1$ is an alkyl or alkenyl group whose carbon atom adjacent to Si is a primary carbon atom, and the other of $R^1$ is an aralkyl group whose carbon atom adjacent to Si is a primary carbon atom; when n is a number satisfying the condition of 0<n<2 or 2<n<4, $R^1$ is an alkyl or alkenyl group whose carbon atom adjacent to Si is a primary carbon atom; $R^2$ is a hydrocarbon group; and n is a number satisfying the condition of 0<n<4.

The third process for preparing an olefin polymer according to the present invention is a process for preparing an olefin polymer, comprising the steps of:

polymerizing or copolymerizing an olefin in the presence of an olefin polymerization catalyst comprising:

[A] a solid titanium catalyst component containing magnesium, titanium, halogen and an electron donor as essential components,

[B] an organoaluminum compound catalyst component, and

[D] an electron donor catalyst component represented by the following formula [II]:

$$R^1{}_nSi(OR^2)_{4-n} \quad [II]$$

wherein when n is 2, one of $R^1$ is an alkyl or alkenyl group whose carbon atom adjacent to Si is a primary carbon atom, and the other of $R^1$ is an aralkyl group whose carbon atom adjacent to Si is a primary carbon atom; when n is a number satisfying the condition of 0<n<2 or 2<n<4, $R^1$ is an alkyl or alkenyl group whose carbon atom adjacent to Si is a primary carbon atom; $R^2$ is a hydrocarbon group; and n is a number satisfying the condition of 0<n<4; and then polymerizing or copolymerizing an olefin with addition of:

[C] an electron donor catalyst component represented by the following formula [I]:

$$R^1{}_2Si(OR^2)_2 \quad [I]$$

wherein $R^1$ is an alkyl, cycloalkyl, cycloalkenyl or aryl group whose carbon atom adjacent to Si is a secondary or tertiary carbon atom; and $R^2$ is a hydrocarbon group.

According to the present invention, an olefin polymer having an extremely wide molecular weight distribution, good moldability and high stereoregularity can be prepared in a high yield. Moreover, the above-mentioned catalysts are hardly reduced in the polymerization activity, so that a melt flow rate of the olefin polymer can be easily adjusted by the process of the invention using such catalysts. Further, according to the present invention, a molecular weight distribution of the resulting olefin polymer can be easily regulated.

DETAILED DESCRIPTION OF THE INVENTION

The process for preparing an olefin polymer according to the present invention will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

In the first process for preparing an olefin polymer according to the present invention, at first, an olefin is polymerized or copolymerized in the presence of an olefin poymerization catalyst comprising a specific solid titanium catalyst component [A], a specific organoaluminum compound catalyst component [B] and a specific electron donor catalyst component [C] to prepare an olefin polymer [I], and an olefin is polymerized or copolymerized in a polymerizer different from that for the polymerization of the above step in the presence of an olefin poymerization catalyst comprising a specific solid titanium catalyst component [A], a specific organoaluminum compound catalyst component [B] and a specific electron donor catalyst component [D] to prepare an olefin polymer [II]. Then, the resulting olefin polymer [I] and the resulting olefin polymer [II] are allowed to coexist in one polymerizer to further polymerize or copolymerize an olefin.

In the second process for preparing an olefin polymer according to the present invention, at first, an olefin is polymerized or copolymerized using an olefin polymerization catalyst comprising a specific solid titanium catalyst component [A], a specific organoaluminum compound catalyst component [B] and a specific electron donor catalyst component [C]. Then, a specific electron donor catalyst component [D] is added to the reaction system to polymerize or copolymerize an olefin.

In the third process for preparing an olefin polymer according to the present invention, at first, an olefin is polymerized or copolymerized using an olefin polymerization catalyst comprising a specific solid titanium catalyst component [A], a specific organoaluminum compound catalyst component [B] and a specific electron donor catalyst component [D]. Then, a specific electron donor catalyst component [C] is added to the reaction system to polymerize or copolymerize an olefin. The polymerization may be carried out in one stage or plural stages.

Figure 1:
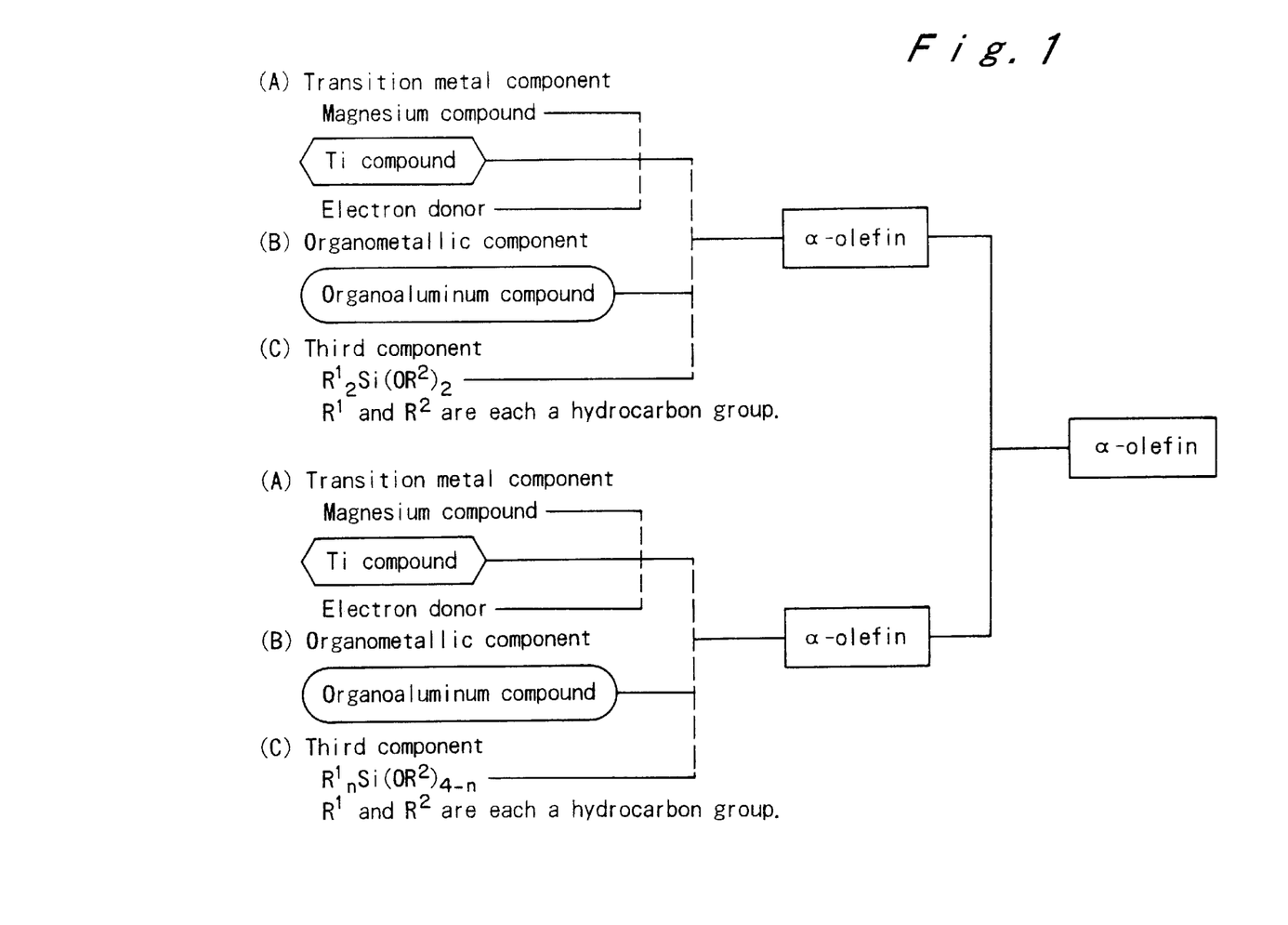
FIG. 1 is a flow chart of one example of a process for preparing an olefin polymer according to the present invention.
Figure 2:
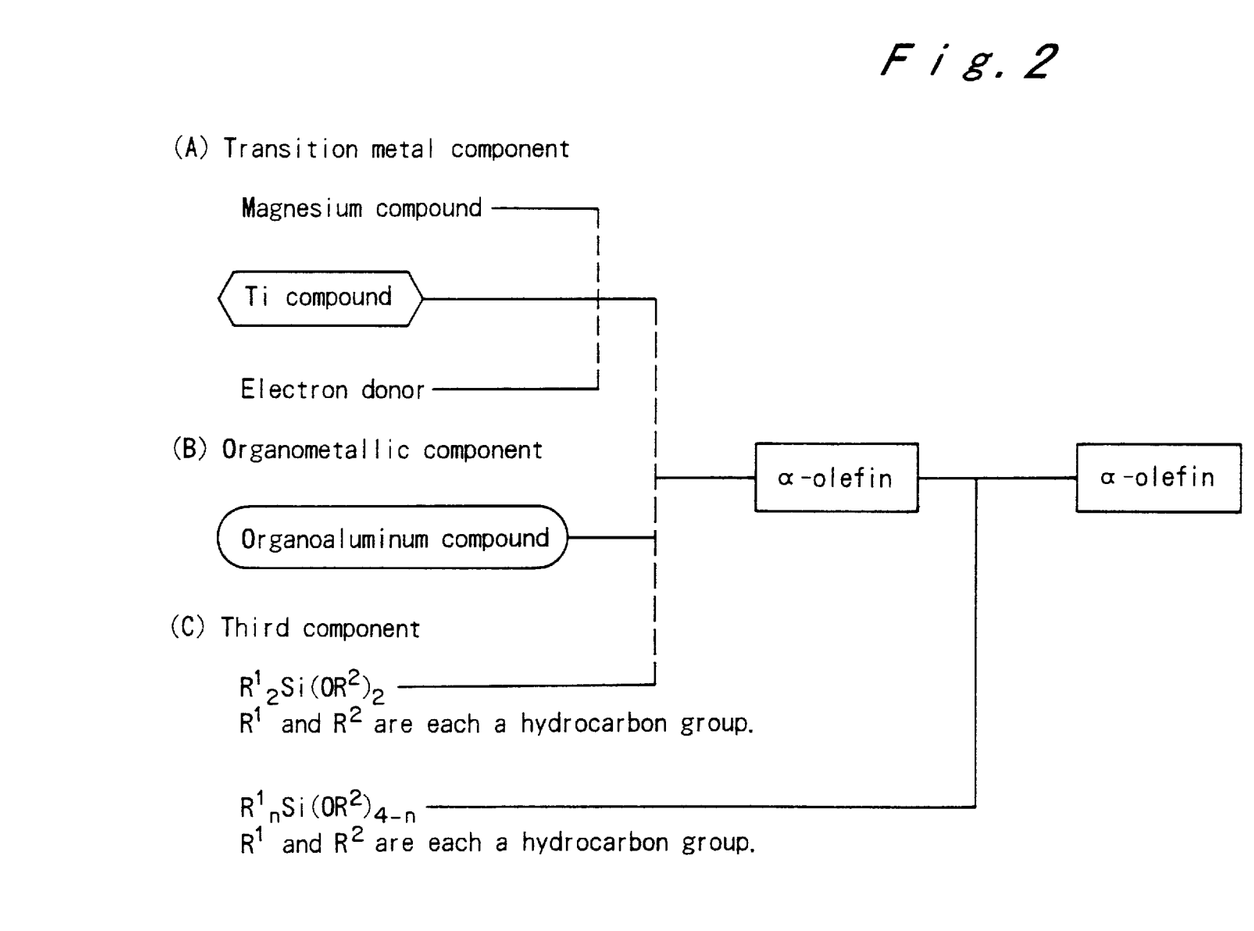
FIG. 2 is a flow chart of another example of a process for preparing an olefin polymer according to the present invention.

FIGS. 1 and 2 are each a flow chart illustrating an example of a process for preparing a catalyst used in the present invention.

First, the catalyst components used in the present invention are described below.

Solid titanium catalyst component [A]

The solid titanium catalyst component [A] used in the invention is a highly active catalyst component containing magnesium, titanium, halogen and an electron donor as its essential components.

The solid titanium catalyst component [A] is prepared by bringing a magnesium compound, a titanium compound and an electron donor, all described below, into contact with each other.

The titanium compound used for preparing the solid titanium catalyst component [A] is, for example, a tetravalent titanium compound represented by $Ti(OR)_g X_{4-g}$ (R is a hydrocarbon group, X is a halogen atom, and $0 \leq g \leq 4$).

Concrete examples of the titanium compound include titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$;

dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums, such as $Ti(OCH_3)_4$, $Ti(OC_2H_5)_4$ and $Ti(O-n-C_4H_9)_4$.

Of these, titanium halides, particularly titanium tetrahalides, are preferred, and titanium tetrachloride is more preferred. These titanium compounds may be used singly or in combination. Further, these titanium compounds may be diluted with hydrocarbon compounds or halogenated hydrocarbon compounds before use.

The magnesium compound used for preparing the solid titanium catalyst component [A] includes a magnesium compound having reducing ability and a magnesium compound having no reducing ability.

The magnesium compound having reducing ability is, for example, a magnesium compound having a magnesium-carbon bond or a magnesium-hydrogen bond. Concrete examples of the magnesium compound having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butylmagnesium halide. These magnesium compounds may be used alone, or may be used as complex compounds with an organoaluminum compound described later. Further, the magnesium compounds may be either liquid or solid.

Concrete examples of the magnesium compound having no reducing ability include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium; and magnesium carboxylates, such as magnesium laurate and magnesium stearate.

The magnesium compounds having no reducing ability may be compounds derived from the aforementioned magnesium compounds having reducing ability or compounds derived during the preparation process of a catalyst component. For deriving the magnesium compounds having no reducing ability from the magnesium compounds having reducing ability, for example, the magnesium compounds having reducing ability are brought into contact with polysiloxane compounds, halogen-containing silane compounds, halogen-containing aluminum compounds, esters or alcohols.

The magnesium compounds having reducing ability and the magnesium compounds having no reducing ability as described above may be used as a complex or double compound with another metal, or may be used as a mixture with another metallic compound.

Of these, preferred are the magnesium compounds having no reducing ability, and more preferred are halogen-containing magnesium compounds (magnesium halides). Particularly, magnesium chloride, alkoxymagnesium chloride and aryloxymagnesium chloride are most preferred.

In the preparation of the solid titanium catalyst component [A], an electron donor is preferably used in the invention. Examples of the electron donor includes oxygen-containing electron donors, such as alcohols, phenols, ketones, aldehydes, carboxylic acids, esters of organic or inorganic acids, ethers, acid amides and acid anhydrides; and nitrogen-containing electron donors, such as ammonia, amines, nitrites and isocyanates.

Concrete examples of such electron donor include:

alcohols having 1 to 18 carbon atoms, such as methanol, ethanol, propanol, pentanol, hexanol, octanol, 2-ethylhexanol, dodecanol, octadecyl alcohol, benzyl alcohol, phenylethyl alcohol, cumyl alcohol and isopropylbenzyl alcohol;

phenols having 6 to 25 carbon atoms which may contain an alkyl group, such as phenol, cresol, xylenol, ethylphenol, propylphenol, cumylphenol, nonylphenol and naphthol;

ketones having 3 to 15 carbon atoms, such as acetone, methyl ethyl ketone, methyl isobutyl ketone, acetophenone and benzophenone;

aldehydes having 2 to 15 carbon atoms, such as acetaldehyde, propionaldehyde, octylaldehyde, benzaldehyde, tolualdehyde and naphthaldehyde;

organic acid esters having 2 to 30 carbon atoms, including polycarboxylic acid esters described later, and other esters, e.g., methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, γ-butyrolactone, δ-valerolactone, coumarin phthalide and ethylene carbonate;

inorganic acid esters, such as ethyl silicate and butyl silicate;

acid halides having 2 to 15 carbon atoms, such as acetyl chloride, benzoyl chloride, toluoyl chloride, anisoyl chloride and phthaloyl chloride;

ethers having 2 to 20 carbon atoms, such as methyl ether, ethyl ether, isopropyl ether, butyl ether, amyl ether, tetrahydrofuran, anisole and diphenyl ether;

acid amides, such as acetamide, benzamide and toluamide;

acid anhydrides, such as benzoic anhydride and phthalic anhydride;

amines, such as methylamine, ethylamine, triethylamine, tributylamine, piperidine, tribenzylamine, aniline, pyridine, picoline and tetramethylethylenediamine; and nitriles, such as acetonitrile, benzonitrile and trinitrile.

Also employable as the electron donor is an organosilicon compound represented by the following formula [III]

$$R_nSi(OR')_{4-n} \quad [III]$$

wherein R and R' are each a hydrocarbon group, and n is a number satisfying the condition of 0<n<4.

Concrete examples of the organosilicon compound represented by the above formula [III] include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxysilane), vinyltriacetoxysilane, dimethyltetraethoxydisiloxane, dicyclohexylmethyldimethoxysilane, cyclopentylmethyldimethoxysilane, dicyclopentyldimethoxysilane, dicyclopentylmethyldimethoxysilane, dicyclopentyldiethoxysilane, di-n-propyldiethoxysilane, di-t-butyldiethoxysilane and cyclopentyltriethoxysilane. Of these, preferred are ethyltriethoxysilane, n-ropyltriethoxysilane, t-butyltriethoxysilane, inyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

These electron donors may be used in combination of two or more kinds.

The electron donors desirably contained in the titanium catalyst component are esters, and particularly preferred are polycarboxylic acid esters (i.e., polycarboxylates) having skeletons represented by the following formulas.

In the above formulas, $R^1$ is a substituted or unsubstituted hydrocarbon group; $R^2$, $R^5$ and $R^6$ are each hydrogen or a substituted or unsubstituted hydrocarbon group; $R^3$ and $R^4$ are each hydrogen or a substituted or unsubstituted hydrocarbon group, preferably at least one of them being a substituted or unsubstituted hydrocarbon group; and $R^3$ and $R^4$ may be bonded to each other. The hydrocarbon groups shown by $R^1$ through $R^5$ include hydrocarbon groups containing heteroatoms such as N, O and S, for example, those having groups such as C—O—C, COOR, COOH, OH, SO₃H, —C—N—C and NH.

Of the polycarboxylates, particularly preferred are diesters of dicarboxylic acids represented by the above formulas wherein at least one of $R^1$ and $R^2$ is an alkyl group having 2 or more carbon atoms.

Concrete examples of such polycarboxylates include:

aliphatic polycarboxylates, such as diethyl succinate, dibutyl succinate, diethyl methylsuccinate, diisobutyl α-methylglutarate, dibutyl methylmalonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate, dibutyl itaconate, dioctyl citraconate and dimethyl citraconate;

alicyclic polycarboxylates, such as diethyl 1,2-cyclohexanecarboxylate, diisobutyl 1,2-cyclohexanecarboxylate, diethyl tetrahydrophthalate and diethyl nadiate;

aromatic polycarboxylates, such as monoethyl phthalate, dimethyl phthalate, methylethyl phthalate, monoisobutyl phthalate, mono-n-butyl phthalate, diethyl phthalate, ethyl isobutylphthalate, ethyl n-butylphthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylates, such as 3,4-furandicarboxylate.

Concrete examples of the esters of polyhydroxy compounds include 1,2-diacetoxybenzene, 1-methyl-2,3-diacetoxybenzene, 2,3-diacetoxynaphthalene, ethylene glycol dipivalate and butanediol pivalate.

Concrete examples of the hydroxy-substituted carboxylates include benzoyl ethylsalicylate, acetyl isobutylsalicylate and acetyl methylsalicylate.

The polycarboxylates which can be included in the titanium catalyst component further include esters of long chain dicarboxylic acids, such as diethyl adipate, diisobutyl adipate, diisopropyl sebacate, di-n-butyl sebacate, di-n-octyl sebacate and di-2-ethylhexyl sebacate, in addition to the above-mentioned compounds.

Of the above-exemplified polyfunctional esters, preferred are compounds having skeletons represented by the aforesaid formulas. More preferred are esters of phthalic acid, maleic acid, substituted malonic acid, etc. with alcohols having 2 or more carbon atoms, and most preferred are diesters of phthalic acid with alcohols having 2 or more carbon atoms.

Other electron donor components which can be included in the titanium catalyst components than the above-mentioned ones are, for example, monocarboxylic acid esters represented by RCOOR' (R and R' are each a hydrocarbon group which may have a substituent group, and at least one of them is a branched chain group (including a cyclic group) or a ring-containing chain group. Concrete examples of R and R' include (CH₃)₂CH—, C₂H₅CH(CH₃)—, (CH₃)₂CHCH₂—, (CH₃)₃C—, C₂H₅CH—, (CH₃)CH₂—, If one of R and R' is any of the above groups, the other may be either any of the above groups or other group such as a straight chain group or a cyclic group.

Examples of the monocarboxylic acid esters include monoesters of various acids such as dimethylacetic acid, trimethylacetic acid, α-methylbutyric acid, β-methylbutyric acid, methacrylic acid and benzoylacetic acid; and monocarboxylic acid esters of various alcohols such as isopropanol, isobutyl alcohol and tert-butyl alcohol.

Carbonic acid esters are also employable as the electron donor. Concrete examples of the carbonic acid esters include diethyl carbonate, ethylene carbonate, diisopropyl carbonate, phenylethyl carbonate and diphenyl carbonate.

For supporting those electron donors in the solid titanium catalyst component, they are not always used as the starting material, and compounds which are able to change to those electron donors during the preparation process of the solid titanium catalyst component may be used.

In the solid titanium catalyst component, other electron donor than the above-mentioned ones may be contained, but the amount thereof should be small because use of too large amount of such electron donor gives an adverse effect.

In the invention, the solid titanium catalyst component [A] can be prepared by bringing the magnesium compound (or metallic magnesium), the electron donor and the titanium compound mentioned above into contact with each other. For preparing the solid titanium catalyst component [A], there can be used any of known processes for preparing a highly active titanium catalyst component using a magnesium compound, a titanium compound and an electron donor. The above-mentioned components may be contacted with each other in the presence of reaction aids such as silicon, phosphorus and aluminum.

Some examples of a process for preparing the solid titanium catalyst component [A] are briefly described below.

(1) A process of reacting the magnesium compound (or a complex compound of the magnesium compound and the electron donor) with the titanium compound.

This reaction may be carried out in the presence of a pulverizing assisting agent. Further, the compound in the solid state may be pulverized prior to the reaction.

(2) A process of reacting the liquid magnesium compound having no reducing ability with the liquid titanium compound in the presence of the electron donor to precipitate a solid titanium complex compound.

(3) A process of further reacting the reaction product obtained in the above process (2) with the titanium compound.

(4) A process of further reacting the reaction product obtained in the above process (1) or (2) with the electron donor and the titanium compound.

(5) A process comprising pulverizing the magnesium compound or a complex compound of the magnesium compound and the electron donor in the presence of the titanium compound to give a solid product and treating the solid product with either halogen, a halogen compound or an aromatic hydrocarbon.

In this process, the magnesium compound or the complex compound of the magnesium compound and the electron donor may be pulverized in the presence of a pulverizing assisting agent. Further, it is also possible that the magnesium compound or the complex compound of the magnesium compound and the electron donor is pulverized in the presence of the titanium compound, and the pulverized product is pre-treated with a reaction aid and then treated with halogen. As the reaction aid, an organoaluminum compound or a halogen-containing silicon compound may be used.

(6) A process of treating the compound obtained by any of the above processes (1) to (4) with halogen, a halogen compound or an aromatic hydrocarbon.

(7) A process of bringing a reaction product obtained by contact of a metallic oxide, dihydrocarbonylmagnesium and halogen-containing alcohol into contact with the electron donor and the titanium compound.

(8) A process of reacting the magnesium compound such as magnesium salt of organic acid, alkoxymagnesium or aryloxymagnesium with the electron donor, the titanium compound and/or a halogen-containing hydrocarbon.

Of the processes (1) to (8) for preparing the solid titanium catalyst component [A], preferred are the process in which a liquid titanium halide is used and the process in which a halogenated hydrocarbon is used after or together with the use of the titanium compound.

The amounts of each components used for preparing the solid titanium catalyst components [A] vary depending upon the process for preparation of the catalyst. In general, the electron donor is used in an amount of about 0.01 to 5 mol, preferably 0.05 to 2 mol, per 1 mol of the magnesium compound; and the titanium compound is used in an amount of about 0.01 to 500 mol, preferably 0.05 to 300 mol, per 1 mol of the magnesium compound.

The solid titanium catalyst component [A] obtained by the above process contains magnesium, titanium, halogen and the electron donor as essential components.

In the solid titanium catalyst component [A], it is desired that the atomic ratio of halogen to titanium (halogen/titanium) is in the range of about 4 to 200, preferably about 5 to 100; and the molar ratio of the electron donor to titanium (electron donor/titanium) is in the range of about 0.1 to 10, preferably about 0.2 to about 6; and the atomic ratio of magnesium to titanium (magnesium/titanium) is in the range of about 1 to 100, preferably about 2 to 50.

The magnesium halide contained in the solid titanium catalyst component [A] is smaller in its crystal size than the commercially available magnesium halide. The specific surface area of the magnesium halide contained in the solid titanium catalyst component [A] is usually not less than about 50 m$^2$/g, preferably in the range of about 60 to 1,000 m$^2$/g, more preferably about 100 to 800 m$^2$/g. The solid titanium catalyst component [A] is not substantially varied in its composition even if it is washed with hexane, because the above-mentioned components are united to form the catalyst component.

The solid titanium catalyst component [A] may be used as it is, or may be used by diluting it with inorganic or organic compounds, such as a silicon compound, an aluminum compound and a polyolefin. When such diluent is used, the solid titanium catalyst component [A] exhibits a high catalytic activity even if its specific surface area is smaller than the above-mentioned value.

The process for preparing the highly active titanium catalyst component is disclosed in, for example, Japanese Patent Laid-Open Publications No. 108385/1975, No. 126590/1975, No. 20297/1976, No. 28189/1976, No. 64586/1976, No. 92885/1976, No. 136625/1976, No. 87489/1977, No. 100596/1977, No. 147688/1977, No. 104593/1977, No. 2580/1978, No. 40093/1978, No. 40094/1978, No. 43094/1978, No. 135102/1980, No. 135103/1980, No. 152710/1980, No. 811/1981, No. 11908/1981, No. 18606/1981, No. 83006/1983, No. 138705/1983, No. 138706/1983, No. 138707/1983, No. 138708/1983, No. 138709/1983, No. 138710/1983, No. 138715/1983, No. 23404/1985, No. 21109/1986, No. 37802/1986 and No. 37803/1996.

Organoaluminum Compound Catalyst Component [B]

The organoaluminum compound catalyst component [B] used in the present invention includes a compound having at least one aluminum-carbon bond.

Examples of the organoaluminum compound include:
(i) organoaluminum compounds represented by the following formula $$R^1_m Al(OR^2)_n H_p X_q$$

wherein $R^1$ and $R^2$ may be the same or different and represent independently a hydrocarbon group having normally 1 to 15 carbon atoms, preferably 1 to 4 carbon atoms; X is halogen atom; and m, n, p and q are numbers satisfying $0<m\leq3$, $0\leq n<3$, $0\leq p<3$, $0\leq q<3$ and $m+n+p+q=3$;

(ii) complex alkyl compounds of aluminum with Group I metals of the periodic table, represented by the following formula $$M^1 AlR^1_4$$

wherein $M^1$ is Li, Na or K and $R^1$ is as defined above

Examples of the organoaluminum compounds represented by the formula (i) include such compounds as follows;

compounds having the general formula of $R^1_m Al(OR^2)_{3-m}$ wherein $R^1$ and $R^2$ are as defined above, and m is a number preferably satisfying $1.5\leq m\leq 3$;

compounds having the general formula of $R^1_m AlX_{3-m}$ wherein $R^1$ is as defined above, X is halogen atom, and m is a number preferably satisfying $0<m<3$;

compounds having the general formula of $R^1_m AlH_{3-m}$ wherein $R^1$ is as defined above, and m is a number preferably satisfying $2\leq m<3$; and compounds having the general formula of $R^1_m Al(OR^2)_n X_q$ wherein $R^1$ and $R^2$ are as defined above, X is a halogen atom, and m, n and q are numbers satisfying $0<m\leq 3$, $0\leq n<3$, $0\leq q<3$ and $m+n+q=3$.

Concrete examples of the organoaluminum compounds represented by the formula (i) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of $R^1_{2.5} Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides, for example, ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydride, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the organoaluminum compounds similar to the above-mentioned compounds represented by formula (i) include organoaluminum compounds in which two or more aluminum are bonded together via an oxygen atom or a nitrogen atom. Concrete examples of such compounds are as follows:

and

Examples of the organoaluminum compounds represented by the formula (ii) include and Of these, particularly preferred are trialkylaluminums or alkylaluminums in which two or more kinds of aluminum compounds are bonded.

Electron Donor Catalyst Component [C]

The electron donor catalyst component [C] used for the present invention is an organosilicon compound represented by the following formula [I].

$$R^1{}_2Si(OR^2)_2 \qquad [I]$$

In the above formula [I], $R^1$ is an alkyl, cycloalkyl, cycloalkenyl or aryl group whose carbon atom adjacent to Si is a secondary or tertiary carbon atom. Preferably, $R^1$ is an alkyl, cycloalkyl or cycloalkenyl group whose carbon atom adjacent to Si is a secondary or tertiary carbon atom. Concretely, there can be mentioned an alkyl group, such as isopropyl group, sec-butyl group, t-butyl group and t-amyl group; a cycloalkyl group, such as cyclopentyl group and cyclohexyl group; a cycloalkenyl group, such as cyclopentenyl group and cyclopentadienyl group; and an aryl group, such as phenyl group and tolyl group. The substituent groups of those groups may contain halogen, silicon, oxygen, nitrogen, sulfur, phosphorus and boron. Of the above groups, preferred are an alkyl group and a cycloalkyl group.

$R^2$ in the above formula [I] is a hydrocarbon group, preferably a hydrocarbon group having 1 to 5 carbon atoms, more preferably a hydrocarbon group having 1 to 2 carbon atoms.

Concrete examples of the organosilicon compounds of the formula (I) preferably used in the invention include diisopropyldimethoxysilane, diisopropyldiethoxysilane, di-sec-butyldimethoxysilane, di-t-butyldimethoxysilane, di-t-amyldimethoxysilane, dicyclopentyldimethoxysilane, dicyclohexyldimethoxysilane, diphenyldimethoxysilane, bis-o-tolyldimethoxysilane, bis-m-tolyldimethoxysilane, bis-p-tolyldimethoxysilane, bisethylphenyldimethoxysilane, isobutylisopropyldimethoxysilane, and cyclohexylisopropyldimethoxysilane.

As the organosilicon compound, there can be used a compound from which the organosilicon compound is derived under the conditions of olefin polymerization or prepolymerization. In this case, such compound is added in the olefin polymerization stage or the prepolymerization stage to produce the organosilicon compound simultaneously with the olefin polymerization or the prepolymerization.

Electron donor catalyst component [D]

The electron donor catalyst component [D] used for the present invention is an organosilicon compound represented by the following formula [II].

In the above formula [II], n is a number satisfying the condition of 0<n<4; $R^2$ is a hydrocarbon group; when n is 2, one of $R^1$ is an alkyl or alkenyl group whose carbon atom adjacent to Si is a primary carbon atom, and the other of $R^1$ is an aralkyl group whose carbon atom adjacent to Si is a primary carbon atom. Further, when n is a number satisfying the condition of 0<n<2 (namely n is 1) or 2<n<4 (namely n is 3), $R^1$ is an alkyl or alkenyl group whose carbon atom adjacent to Si is a primary carbon atom.

In more detail, when n is 2 in the above formula [II], examples of the group shown by $R^1$ include an alkyl group, such as methyl group, ethyl group, n-propyl group and n-butyl group; an aralkyl group, such as cumyl group and benzyl group; and alkenyl group, such as vinyl group. The substituent groups of these groups may contain halogen, silicon, oxygen, nitrogen, sulfur, phosphorus and boron.

In the above case, $R^2$ is preferably a hydrocarbon group having 1 to 5 carbon atoms, particularly preferably a hydrocarbon group having 1 to 2 carbon atoms.

In the formula [II], when n is a number satisfying the condition of 0<n<2 or 2<n<4, $R^1$ is an alkyl group or an alkenyl group as stated above.

In this case, $R^2$ is preferably a hydrocarbon group having 1 to 5 carbon atoms, particularly preferably a hydrocarbon group having 1 to 2 carbon atoms.

Concrete examples of the organosilicon compound represented by the formula [II] wherein n is 1 or 3 include trimethylmethoxysilane, trimethylethoxysilane, ethyltrimethoxysilane, ethyltriethoxysilane, vinyltriethoxysilane, methyltrimethoxysilane, methyltriethoxysilane, propyltrimethoxysilane, decyltrimethoxysilane, decyltriethoxysilane, propyltriethoxysilane, butyltriethoxysilane, vinyltrimethoxysilane, vinyltributoxysilane, amyltriethoxysilane, isobutyltriethoxysilane, 3,3,3-trifluoropropyltrimethoxysilane and 3,3,3-trifluoropropyltriethoxysilane.

Of these, preferably used are ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, vinyltrimethoxysilane, vinyltributoxysilane, amyltriethoxysilane, isobutyltriethoxysilane, methyltriethoxysilane and 3,3,3-trifluoropropyltriethoxysilane.

As the organosilicon compound, similarly to the case of the aforesaid electron donor catalyst component [C], there can be used a compound from which the organosilicon compound is derived under the conditions of olefin polymerization or prepolymerization. In this case, such compound is added in the olefin polymerization stage or the prepolymerization stage to produce the organosilicon compound simultaneously with the olefin polymerization or the prepolymerization.

In the polymerization process according to the invention, an olefin is polymerized in the presence of the above-mentioned catalyst, and prior to this polymerization, such prepolymerization as described below is preferably carried out.

If the prepolymerization is carried out, a powdery polymer having a high bulk density can be obtained, and the resulting olefin polymer tends to be improved in the stereoregularity. Further, in the case of slurry polymerization, properties of the slurry can be improved by the prepolymerization, and as a result, the obtained polymer powder or polymer slurry can be easily handled.

The prepolymerization is carried out generally in the presence of the solid titanium catalyst component [A] and the organolauminum compound catalyst component [B]. In this case, the electron donor catalyst component [C] or the electron donor catalyst component [D] may be present in the reaction system.

The catalyst concentration in the prepolymerization system may be rather higher than that in the polymerization system.

In the prepolymerization, the solid titanium catalyst component [A] is used in an amount of of usually about 0.01 to 200 mmol, preferably about 0.05 to 100 mmol, per 1 liter of an inert hydrocarbon medium described later.

The organoaluminum compound catalyst component [B] is used in such an amount that a polymer is produced in an amount of 0.1 to 500 g, preferably 0.3 to 300 g, per 1 g of the solid titanium catalyst component [A]. That is, the amount of the organoaluminum compound catalyst component [B] is in the range of usually about 0.1 to 100 mol, preferably about 0.5 to 50 mol, per 1 mol of the titanium atom contained in the solid titanium catalyst component [A].

The prepolymerization is preferably carried out by adding an olefin and the above-mentioned catalyst components to an inert hydrocarbon medium under the mild conditions.

The olefin used for the prepolymerization may be the same of different from an olefin used for the polymerization described later.

The inert hydrocarbon solvent used for the prepolymerization is similar to that used for the polymerization described later. The inert hydrocarbon solvent used for the prepolymerization may be partially or wholly replaced with a liquid α-olefin.

The prepolymerization is carried out at such a temperature that the resulting polymer is not substantially dissolved in the inert hydrocarbon medium. That is, the temperature for the prepolymerization reaction is in the range of usually −20° to +100° C., preferably about −20° to +80° C., more preferably 0° to +40° C.

A molecular weight regulator such as hydrogen may be used in the prepolymerization. The molecular weight regulator is desirably used in such an amount that the intrinsic viscosity [η], as measured in decalin at 135° C., of the polymer obtained by the prepolymerization is not less than about 0.2 dl/g, preferably in the range of about 0.5 to 10 dl/g.

It is desired that the prepolymerization is performed in such a manner that a polymer is produced in an amount of about 0.1 to 1,000 g, preferably about 0.3 to 500 g, per 1 g of the titanium catalyst component [A]. If the amount of the polymer produced in the prepolymerization is too large, the production efficiency of the olefin polymer in the polymerization might be sometimes reduced.

The prepolymerization may be carried out either batchwise or continuously.

Preoaration of Olefin Polymer

In the first process for preparing an olefin polymer according to the present invention, at first, an olefin is polymerized or copolymerized in the presence of an olefin poymerization catalyst comprising the solid titanium catalyst component [A], the organoaluminum compound catalyst component [B] and the electron donor catalyst component [C] to prepare an olefin polymer [I], and an olefin is polymerized or copolymerized in an polymerizer different from that for the.polymerization of the above step in the presence of the olefin poymerization catalyst comprising the solid titanium catalyst component [A], the organoaluminum compound catalyst component [B] and the electron donor catalyst component [D] to prepare an olefin polymer [II]. Then, the resulting olefin polymer [I] and the resulting olefin polymer [II] are allowed to coexist in one polymerizer (polymerization reactor) to further polymerize or copolymerize an olefin.

In each of the steps for preparing the olefin polymers [I] and [II], prepolymerization may be carried out prior to the polymerization.

Examples of the olefin employable in the invention include ethylene, propylene, 1-butene, 4-methyl-1-pentene and 1-octene. These olefins may be used singly or in combination. In the invention, it is preferred to use propylene or 1-butene so as to conduct homopolymerization, or to use an olefin mixture containing propylene or 1-butene as a host component so as to conduct copolymerization. In the case of using the olefin mixture, a content of propylene or 1-butene, which is a host component, is usually not less than 50% by mol, preferably not less than 70% by mol.

In the homopolymerization or copolymerization of olefin, a compound having a plurality of unsaturated bonds, such as conjugated diene or non-conjugated diene, may be used as a starting olefin for the polymerization.

The olefin polymerization in this invention is generally carried out in a gas phase or in a liquid phase.

In the case of slurry polymerization, the following inert hydrocarbon or an olefin which is liquid at the reaction temperature may be used as the reaction solvent.

Examples of the inert hydrocarbon medium used herein include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures of these hydrocarbons.

Of the inert hydrocarbon media, aliphatic hydrocarbons are particularly preferred.

In the step for preparing the olefin polymer [I], the titanium catalyst component [A] is used in an amount of usually about 0.0001 to 50 mmol, preferably about 0.01 to 10 mmol, in terms of the Ti atom, per a liter of the polymerization volume. The organoaluminum compound catalyst component [B] is used in an amount of usually about 1 to 2,000 mol, preferably about 2 to 1,000 mol, in terms of the metal atom contained in the organoaluminum compound catalyst component [B], per 1 mol of the titanium atom contained in the titanium catalyst component [A] in the polymerization system. The electron donor catalyst component [C] is used in an amount of usually about 0.001 to 10 mol, preferably about 0.01 to 5 mol, particularly preferably about 0.05 to 2 mol, in terms of the Si atom contained in the electron donor catalyst component [C], per 1 mol of the metal atom contained in the organoaluminum compound catalyst component [B].

The polymerization temperature in the step for preparing the olefin polymer [I] is in the range of usually about 20° to 200° C., preferably about 50° to 180° C.; and the pressure is in the range of usually atmospheric pressure to 100 kg/cm$^2$, preferably about 2 to 50 kg/cm$^2$. The polymerization time is in the range of usually 30 to 600 minutes, preferably 40 to 480 minutes, more preferably 60 to 360 minutes.

In the step for preparing the olefin polymer [II], the titanium catalyst component [A] is used in an amount of usually about 0.0001 to 50 mmol, preferably about 0.01 to 10 mmol, in terms of the Ti atom, per a liter of the polymerization volume. The organoaluminum compound catalyst component [B] is used in an amount of usually about 1 to 2,000 mol, preferably about 2 to 1,000 mol, in terms of the metal atom contained in the organoaluminum compound catalyst component [B], per 1 mol of the titanium atom contained in the titanium catalyst component [A] in the polymerization system. The electron donor catalyst component [D] is used in an amount of usually about 0.001 to 10 mol, preferably about.0.01 to 5 mol, particularly preferably about 0.05 to 2 mol, in terms of the Si atom contained in the electron donor catalyst component [D], per 1 mol of the metal atom contained in the organoaluminum compound catalyst component [B].

The polymerization temperature in the step for preparing the olefin polymer [II] is in the range of usually about 20° to 200° C., preferably about 50° to 180° C.; and the pressure is in the range of usually atmospheric pressure to 100 kg/cm$^2$, preferably about 2 to 50 kg/cm$^2$. The polymerization time is in the range of usually 30 to 600 minutes, preferably 40 to 480 minutes, more preferably 60 to 360 minutes.

In each of the steps for preparing the olefin polymers [I] and [II], the catalyst components may be contacted with each other either in an inert gas atmosphere or in an olefin atmosphere prior to the olefin polymerization. If hydrogen is used in the olefin polymerization, the molecular weight of the resulting polymer can be regulated. As a result, a polymer having a high melt flow rate can be obtained.

In this invention, the resulting olefin polymer [I] and the resulting olefin polymer [II] obtained as above are then allowed to coexist in one polymerizer to further polymerize or copolymerize an olefin. The temperature for this olefin (co)polymerization is in the range of usually about 20° to 200° C., preferably about 50° to 180° C. The pressure therefor is in the range of usually atmospheric pressure to 100 kg/cm$^2$, preferably about 2 to 50 kg/cm$^2$. The polymerization time is in the range of usually 10 to 480 minutes, preferably 20 to 360 minutes, more preferably 30 to 240 minutes.

Next, the second process for preparing an olefin polymer according to the present invention is described below.

In this process, an olefin is (co)polymerized in the presence of an olefin polymerization catalyst comprising the solid titanium catalyst component [A], the organoaluminum compound catalyst component [B] and the electron donor catalyst component [C], and then the electron donor catalyst component [D] is added to the polymerization system to (co)polymerize an olefin. Prior to this olefin polymerization, prepolymerization may be carried out.

Examples of the olefin employable in this process are the same as those described before. Those olefins may be used singly or in combination. It is preferred to use propylene or 1-butene so as to conduct homopolymerization, or to use an olefin mixture containing propylene or 1-butene as a host component so as to conduct copolymerization. In the case of using the olefin mixture, a content of propylene or 1-butene, which is a host component, is usually not less than 50% by mol, preferably not less than 70% by mol.

In the homopolymerization or copolymerization of olefin, a compound having a plurality of unsaturated bonds, such as conjugated diene or non-conjugated diene, may be used as a starting olefin for the polymerization.

The olefin polymerization in this invention is generally carried out in a gas phase or in a liquid phase.

In the case of slurry polymerization, the aforementioned inert hydrocarbon or an olefin which is liquid at the reaction temperature may be used as the reaction solvent.

In the second process for preparing an olefin polymer according to the invention, the titanium catalyst component [A] is used in an amount of usually about 0.0001 to 50 mmol, preferably about 0.01 to 10 mmol, in terms of the Ti atom, per a liter of the polymerization volume. The organoaluminum compound catalyst component [B] is used in an amount of usually about 1 to 2,000 mol, preferably about 2 to 1,000 mol, in terms of the metal atom contained in the organoaluminum compound catalyst component [B], per 1 mol of the titanium atom contained in the titanium catalyst component [A] in the polymerization system. The electron donor catalyst component [C] is used in an amount of usually about 0.001 to 10 mol, preferably about 0.01 to 5 mol, particularly preferably about 0.05 to 2 mol, in terms of the Si atom contained in the electron donor catalyst component [C], per 1 mol of the metal atom contained in the organoaluminum compound catalyst component [B]. The amount of the electron donor catalyst component [D] which is added later is in the range of usually about 0.001 to 10 mol, preferably about 0.01 to 5 mol, particularly preferably about 0.05 to 2 mol, in terms of the Si atom contained in the electron donor catalyst component [D], per 1 mol of the metal atom contained in the organoaluminum compound catalyst component [B].

The catalyst components may be contacted with each other either in an inert gas atmosphere or in an olefin atmosphere prior to the olefin polymerization. If hydrogen is used in the olefin polymerization, the molecular weight of the resulting polymer can be regulated. As a result, a polymer having a high melt flow rate can be obtained.

The temperature for the olefin polymerization is in the range of usually about 20° to 200° C., preferably about 50° to 180° C. The pressure therefor is in the range of usually atmospheric pressure to 100 kg/cm$^2$, preferably about 2 to 50 kg/cm$^2$.

In the second process for preparing an olefin polymer according to the invention, the electron donor catalyst component [D] is added to the reaction system at the time when an olefin polymer is produced in an amount of 10 to 90% by weight, preferably 20 to 80% by weight, more preferably 30 to 70% by weight, based on the whole amount of the olefin polymer finally obtained. Then, the polymerization of olefin is further continued under the conditions of a temperature of usually about 20° to 200° C., preferably about 50° to 180° C., and a pressure of usually atmospheric pressure to 100 kg/cm², preferably about 2 to 50 kg/cm². The reaction time is in the range of usually 30 to 600 minutes, preferably 40 to 480 minutes, more preferably 60 to 360 minutes.

Next, the third process for preparing an olefin polymer according to the present invention is described below.

In this process, an olefin is (co)polymerized in the presence of an olefin polymerization catalyst comprising the solid titanium catalyst component [A], the organoaluminum compound catalyst component [B] and the electron donor catalyst component [D], and then the electron donor catalyst component [C] is added to the polymerization system to (co)polymerize an olefin. Prior to this olefin polymerization, prepolymerization may be carried out.

Examples of the olefin employable in this process are the same as those described before. Those olefins may be used singly or in combination. It is preferred to use propylene or 1-butene so as to conduct homopolymerization, or to use an olefin mixture containing propylene or 1-butene as a host component so as to conduct copolymerization. In the case of using the olefin mixture, a content of propylene or 1-butene, which is a host component, is usually not less than 50% by mol, preferably not less than 70% by mol.

In the homopolymerization or copolymerization of olefin, a compound having a plurality of unsaturated bonds, such as conjugated diene or non-conjugated diene, may be used as a starting olefin for the polymerization.

The olefin polymerization in this invention is generally carried out in a gas phase or in a liquid phase.

In the case of slurry polymerization, the aforementioned inert hydrocarbon or an olefin which is liquid at the reaction temperature may be used as the reaction solvent.

In the third process for preparing an olefin polymer according to the invention, the titanium catalyst component [A] is used in an amount of usually about 0.0001 to 50 mmol, preferably about 0.01 to 10 mmol, in terms of the Ti atom, per a liter of the polymerization volume. The organoaluminum compound catalyst component [B] is used in an amount of usually about 1 to 2,000 mol, preferably about 2 to 1,000 mol, in terms of the metal atom contained in the organoaluminum compound catalyst component [B], per 1 mol of the titanium atom contained in the titanium catalyst component [A] in the polymerization system. The electron donor catalyst component [D] is used in an amount of usually about 0.001 to 10 mol, preferably about 0.01 to 5 mol, particularly preferably about 0.05 to 2 mol, in terms of the Si atom contained in the electron donor catalyst component [D], per 1 mol of the metal atom contained in the organoaluminum compound catalyst component [B]. The amount of the electron donor catalyst component [C] which is added later is in the range of usually about 0.001 to 10 mol, preferably about 0.01 to 5 mol, particularly preferably about 0.05 to 2 mol, in terms of the Si atom contained in the electron donor catalyst component [C], per 1 mol of the metal atom contained in the organoaluminum compound catalyst component [B].

The catalyst components may be contacted with each other either in an inert gas atmosphere or in an olefin atmosphere prior to the olefin polymerization. If hydrogen is used in the olefin polymerization, the molecular weight of the resulting polymer can be regulated. As a result, a polymer having a high melt flow rate can be obtained.

The temperature for the olefin polymerization is in the range of usually about 20° to 200° C., preferably about 50° to 180° C. The pressure therefor is in the range of usually atmospheric pressure to 100 kg/cm², preferably about 2 to 50 kg/cm².

In the third process for preparing an olefin polymer according to the invention, the electron donor catalyst component [C] is added to the reaction system at the time when an olefin polymer is produced in an amount of 10 to 90% by weight, preferably 20 to 80% by weight, more preferably 30 to 70% by weight, based on the whole amount of the olefin polymer finally obtained. Then, the polymerization of olefin is further continued under the conditions of a temperature of usually about 20° to 200° C., preferably about 50° to 180° C., and a pressure of usually atmospheric pressure to 100 kg/cm², preferably about 2 to 50 kg/cm². The reaction time is in the range of usually 30 to 600 minutes, preferably 40 to 480 minutes, more preferably 60 to 360 minutes.

Though the olefin polymerization may be carried out either batchwise, semi-continuously or continuously, it is preferably carried out continuously from the viewpoint of production efficiency.

The olefin polymer obtained in the above processes may be any of a homopolymer, a random copolymer and a block copolymer.

The olefin polymer obtained by the processes of the invention has a wide molecular weight distribution, and hence the polymer is excellent in processability (moldability) in the melt molding process. From the olefin polymer obtained by the processes of the invention, a molded article having high mechanical properties and high transparency can be produced.

According to the processes of the present invention, an olefin polymer having an extremely wide molecular weight distribution, for example, an olefin polymer having Mw/Mn of 7~10, preferably 8~10, can be obtained. Moreover, regulation of a molecular weight distribution of the resulting olefin polymer prepared by the present process can be easily made.

EFFECT OF THE INVENTION

According to the present invention, an olefin polymer having an extremely wide molecular weight distribution, good moldability and high stereoregularity can be obtained in a high yield. Further, according to the present invention, a molecular weight distribution of the resulting olefin polymer can be easily regulated.

EXAMPLE

The present invention will be further described with reference to examples, but it should be construed that the invention is in no way limited to those examples.

Example 1

[Preparation of a solid titanium catalyst component [A]]

7.14 g (75 mmol) of magnesium chloride anhydride, 37.5 ml of decane and 35.1 ml (225 mmol) of 2-ethylhexyl alcohol were reacted with each other under heating at 130° C. for 2 hours, to give a uniform solution. To the uniform solution was then added 1.67 g (11.3 mmol) of phthalic anhydride, and they were stirred at 130° C. for 1 hour to dissolve phthalic anhydride in the solution.

The uniform solution thus obtained was cooled to room temperature, and to the solution was dropwise added 200 ml (1.8 mol) of titanium tetrachloride kept at −20 ° C. over a period of 1 hour. After the addition, the temperature of the solution was elevated to 110° C. over a period of 4 hours. When the temperature of the solution reached 110° C., 5.03 ml (18.8 mmol) of diisobutyl phthalate was added to the solution.

Then, the solution was further stirred at the same temperature as above for 2 hours to perform reaction. After completion of the 2 hours' reaction, the resulting solid portion was collected by hot filtration. The solid portion was suspended again in 275 ml of $TiCl_4$, and the resulting suspension was heated to react again at 110° C. for 2 hours.

After the reaction was completed, the resulting solid portion was collected again by hot filtration, and then washed with decane and hexane at 110° C. The washing was continued until any titanium compound was not detected in the washing liquid.

Thus, a solid titanium catalyst component [A] was synthesized as a hexane slurry. A portion of the catalyst component was withdrawn, then dried and analyzed. As a result, the solid titanium catalyst component [A] obtained as above contained titanium, chlorine, magnesium and diisobutyl phthalate in amounts of 2.5% by weight, 58% by weight, 18% by weight, and 13.8% by weight, respectively.

[Prepolymerization]

Into a 400 ml glass reactor having been purged with nitrogen was introduced 200 ml of purified hexane and were then added 6 mmol of triethylaluminum and 2 mmol (in terms of titanium atom) of the solid titanium catalyst component [A]. Thereafter, to the reactor was further fed propylene at a feed rate of 5.9N liter/hr over a period of 1 hour, to polymerize propylene in an amount of 2.8 g per 1 g of the titanium catalyst component [A].

After this prepolymerization, the reaction liquid was filtered to remove the liquid portion, and the residual solid portion was dispersed again in decane.

[Polymerization]

A 2-liter autoclave was charged with 750 ml of purified hexane, and separately, a 5-liter autoclave was charged with 750 ml of purified hexane. Into each of the autoclaves was introduced 0.75 mmol of triethylaluminum at room temperature in a propylene atmosphere. Then, to the 2-liter autoclave were added 0.038 mmol of propyltriethoxysilane and 0.015 mmol (in terms of titanium atom, corresponding to 4.46 mg of the catalyst component [A]) of the prepolymerized product of the catalyst component [A]. On the other hand, to the 5-liter autoclave were added 0.038 mmol of dicyclopentyldimethoxysilane and 0.015 mmol (in terms of titanium atom, corresponding to 4.46 mg of the catalyst component [A]) of the prepolymerized product of the catalyst component [A].

Thereafter, to each of the autoclaves was added 200N ml of hydrogen, and the temperature of the system was elevated to 70° C. to perform polymerization simultaneously in both autoclaves for 1 hour while keeping the pressure at 7 kg/cm²-G by feeding propylene. After the pressure is rapidly released from both autoclaves, the content of the 2-liter autoclave was transferred into the 5-liter autoclave by means of a propylene pressure. Immediately after the transference of the solution, 200N ml of hydrogen was added to the system, and the temperature of the system was elevated to 70° C. to perform polymerization for 10 minutes while keeping the pressure at 7 kg/cm²-G by feeding propylene.

After the polymerization was completed, a slurry containing the resulting polymer was separated into a particulate white polymer and a liquid phase portion by filtration. After drying, the particulate white polymer was measured on an extraction residual ratio of boiling n-heptane, MFR, apparent bulk specific gravity (BD), polymerization activity, isotactic index (t-I.I.) of the total polymer and molecular weight distribution (Mw/Mn).

The results are set forth in Table 1.

Example 2

The procedure of the polymerization in Example 1 was repeated except for using vinyltriethoxysilane in place of propyltriethoxysilane, to perform polymerization of propylene.

The results are set forth in Table 1.

Examples 3 & 4

The procedure of the polymerization in Example 1 and in Example 2 was repeated except for using di-t-butyldimethoxysilane in place of dicyclopentyldimethoxysilane, respectively, to perform polymerization of propylene.

The results are set forth in Table 1.

Example 5

The procedure of the polymerization in Example 1 was repeated except for using β-phenethylmethyldiethoxysilane in place of propyltriethoxysilane, to perform polymerization of propylene.

The results are set forth in Table 1.

Example 6

The procedure of the polymerization in Example 1 was repeated except for using triethylmethoxysilane in place of propyltriethoxysilane, to perform polymerization of propylene.

The results are set forth in Table 1.

Example 7

[Preparation of a solid titanium catalyst component (B)]

After a 2-liter high-speed stirring device (produced by Tokushu Kika Kogyo K.K.) was thoroughly purged with nitrogen, 700 ml of purified decane, 10 g of commercially available $MgCl_2$, 24.2 g of ethanol, and 3 g of sorbitan distearate were fed to the stirring device. The temperature of the system was elevated with stirring of the contents in the device, and the contents were further stirred at 800 rpm at a temperature of 120° C. for 30 minutes. While stirring, the reaction liquid was then transferred into a glass flask equipped with a stirrer and containing 1 liter of purified decane which was beforehand cooled to −10° C., by the use of a Teflon tube having an inner diameter of 5 mm. The resulting purified suspension was filtered and then well washed with hexane, to obtain a spherical solid (carrier).

Separately, 150 ml of $TiCl_4$ was introduced into a 400 ml glass container equipped with a stirrer, and to the container was added the above-obtained carrier at room temperature to give a suspension. After the addition was completed, the temperature of the system was elevated to 40° C., and 5.2 mmol of diisobutyl phthalate was added to the system. Then, the temperature of the system was further elevated to 100° C. and the system was kept at the same temperature for 2 hours.

Subsequently, the resulting suspension was separated into a solid portion and a liquid portion. The solid portion was suspended again in 150 ml of $TiCl_4$ to perform reaction at 120° C. for 2 hours with stirring. The resulting mixture was subjected to hot filtration and then washed with a sufficient amount of purified hexane until no chlorine ion was detected in the filtrate. Thus, a solid titanium catalyst component (B) was obtained. The solid titanium catalyst component (B) contained titanium, magnesium, chlorine and diisobutyl phthalate in amounts of 3.1% by weight, 17% by weight, 58% by weight and 17.3% by weight, respectively.

[Prepolymerization]

The procedure of the prepolymerization in Example 1 was repeated except for using the solid titanium catalyst component (B), to preform prepolymerization of propylene.

[Polymerization]

The procedure of the polymerization in Example 1 was repeated except for using the prepolymerized solid titanium catalyst component (B), to perform polymerization of propylene.

The results are set forth in Table 1.

Comparative Example 1

The procedure of the polymerization in Example 1 was repeated except for using dicyclopentyldimethoxysilane as the electron donor catalyst component in both of the autoclaves, to perform polymerization of propylene.

The results are set forth in Table 1.

Comparative Example 2

The procedure of the polymerization in Example 1 was repeated except for using propyltriethoxysilane as the electron donor catalyst component in both of the autoclaves, to perform polymerization of propylene.

The results are set forth in Table 1.

Comparative Example 3

The procedure of the polymerization in Example 1 was repeated except for using vinyltriethoxysilane in place of dicyclopentyldimethoxysilane, to perform polymerization of propylene.

The results are set forth in Table 1.

Comparative Example 4

[Polymerization]

To a 2-liter autoclave was introduced 750 ml of purified hexane and were then added simultaneously 0.75 mmol of triethylaluminum, 0.038 mmol of dicyclopentyldimethoxysilane, 0.038 mmol of propyltriethoxysilane and 0.015 mmol (in terms of titanium atom, corresponding to 4.46 mg of the catalyst component [A]) of the prepolymerized product of the catalyst component [A] at room temperature in a propylene atmosphere. After 200N ml of hydrogen was added to the reaction system, the temperature of the system was elevated to 70° C. to perform polymerization of propylene for 2 hours. During the polymerization, the pressure was kept at 7 kg/cm$^2$-G by feeding propylene.

After the polymerization was completed, a slurry containing the resulting polymer was separated into a particulate white polymer and a liquid phase portion by filtration.

The results are set forth in Table 1.

TABLE 1-1

| | Electron Donor for Olefin Polymer (II) | Electron Donor for Olefin Polymer (I) | Extraction Residual Ratio of Boiling Heptane [%] | MFR (g/10 min) | BD (g/cc) | Catalytic Activity (g-pp/mM-Ti) | t-I.I. (%) | Mw/Mn |
|---|---|---|---|---|---|---|---|---|
| Ex. 1 | propyl- tri- ethoxy- silane | dicyclo- pentyl- di- methoxy- silane | 99.3 | 3.7 | 0.44 | 10,700 | 99.1 | 8.48 |
| Ex. 2 | vinyl- tri- ethoxy- silane | dicyclo- pentyl- di- methoxy- silane | 98.9 | 4.3 | 0.44 | 8,900 | 98.6 | 8.33 |
| Ex. 3 | propyl- tri- ethoxy- silane | di-t- butyl- di- methoxy- silane | 99.2 | 4.1 | 0.43 | 9,800 | 98.9 | 7.88 |
| Ex. 4 | vinyl- tri- ethoxy- silane | di-t- butyl- di- methoxy- silane | 98.9 | 4.4 | 0.42 | 7,900 | 98.6 | 7.72 |
| Ex. 5 | β- phenethyl- methyl- diethoxy- silane | dicyclo- penta- dienyl- di- methoxy- silane | 98.7 | 10.3 | 0.42 | 8,300 | 98.3 | 8.92 |
| Ex. 6 | triethyl- methoxy- silane | dicyclo- penta- dienyl- di- methoxy- silane | 98.9 | 8.9 | 0.42 | 9,000 | 98.6 | 8.33 |
| Ex. 7 | propyl- tri- ethoxy- silane | dicyclo- penta- dienyl- di- methoxy- silane | 99.0 | 3.2 | 0.44 | 10,100 | 98.8 | 8.40 |

TABLE 1-2

|  | Electron Donor for Olefin Polymer (II) | Electron Donor for Olefin Polymer (I) | Extraction Residual Ratio of Boiling Heptane [%] | MFR (g/10 min) | BD (g/cc) | Catalytic Activity (g-pp/mM-Ti) | t-I.I. (%) | Mw/Mn |
|---|---|---|---|---|---|---|---|---|
| Comp. Ex. 1 | dicyclopentyldimethoxysilane | dicyclopentyldimethoxysilane | 99.4 | 0.5 | 0.45 | 17,800 | 99.2 | 4.13 |
| Comp. Ex. 2 | propyltriethoxysilane | propyltriethoxysilane | 97.1 | 19 | 0.45 | 10,000 | 96.4 | 3.99 |
| Comp. Ex. 3 | propyltriethoxysilane | vinyltriethoxysilane | 95.9 | 23 | 0.42 | 6,900 | 95.3 | 4.02 |
| Comp. Ex. 4 | dicyclopentyldimethoxysilane + propyltriethoxysilane | — | 99.0 | 1.7 | 0.44 | 12,800 | 98.7 | 7.48 |

Example 8

[Polymerization]

To a 2-liter autoclave was introduced 750 ml of purified hexane and were then added 0.75 mmol of triethylaluminum, 0.038 mmol of propyltriethoxysilane and 0.015 mmol (in terms of titanium atom, corresponding to 4.46 mg of the catalyst component [A]) of the prepolymerized product of the catalyst component [A] at room temperature in a propylene atmosphere. After 200N ml of hydrogen was added to the reaction system, the temperature of the system was elevated to 70° C. to perform polymerization for 20 minutes while keeping the pressure at 7 kg/cm$^2$-G by feeding propylene, and to the system was then added 0.038 mmol of dicyclopentyldimethoxysilane to further perform polymerization for 2 hours in total.

After the polymerization was completed, a slurry containing the resulting polymer was separated into a particulate white polymer and a liquid phase portion by filtration. After drying, the particulate white polymer was measured on an extraction residual ratio of boiling n-heptane, MFR, apparent bulk specific gravity (BD), polymerization activity, isotactic index of the total polymer and molecular weight distribution (Mw/Mn).

The results are set forth in Table 2.

Example 9

The procedure of the polymerization in Example 8 was repeated except for varying the polymerization time before the addition of dicyclopentyldimethoxysilane to 30 minutes, to perform polymerization of propylene.

The results are set forth in Table 2.

Example 10

The procedure of the polymerization in Example 8 was repeated except for varying the polymerization time before the addition of dicyclopentyldimethoxysilane to 45 minutes, to perform polymerization of propylene.

The results are set forth in Table 2.

Example 11

The procedure of the polymerization in Example 8 was repeated except for using vinyltriethoxysilane in place of propyltriethoxysilane, to perform polymerization of propylene.

The results are set forth in Table 2.

Example 12

The procedure of the polymerization in Example 8 was repeated except for using di-t-butyldimethoxysilane in place of dicyclopentyldimethoxysilane, to perform polymerization of propylene.

The results are set forth in Table 2.

Example 13

The procedure of the polymerization in Example 8 was repeated except for using β-phenethylmethyldiethoxysilane in place of propyltriethoxysilane, to perform polymerization of propylene.

The results are set forth in Table 2.

Example 14

The procedure of the polymerization in Example 8 was repeated except for using triethylmethoxysilane in place of propyltriethoxysilane, to perform polymerization of propylene.

The results are set forth in Table 2.

Example 15

To a 2-liter autoclave was introduced 750 ml of purified hexane and were then added 0.75 mmol of triethylaluminum, 0.038 mmol of dicyclopentyldimethoxysilane and 0.015 mmol (in terms of titanium atom, corresponding to 4.46 mg of the catalyst component [A]) of the prepolymerized product of the catalyst component [A] at room temperature in a propylene atmosphere. After 200N ml of hydrogen was added to the reaction system, the temperature of the system was elevated to 70° C. to perform polymerization for 60 minutes while keeping the pressure at 7 kg/cm²-G by feeding propylene, and to the system was then added 0.038 mmol of propyltriethoxysilane to further perform polymerization for 2 hours in total.

After the polymerization was completed, a slurry containing the resulting polymer was separated into a particulate white polymer and a liquid phase portion by filtration.

The results are set forth in Table 2.

Example 16

The procedure of the polymerization in Example 15 was repeated except for using diethylvinylmethoxysilane in place of propyltriethoxysilane, to perform polymerization of propylene.

The results are set forth in Table 2.

Example 17

The procedure of the polymerization in Example 15 was repeated except for using triethylmethoxysilane in place of propyltriethoxysilane, to perform polymerization of propylene.

The results are set forth in Table 2.

Example 18
[Preparation of a solid titanium catalyst component (B)]

After a 2-liter high-speed stirring device (produced by Tokushu Kika Kogyo K.K.).was thoroughly purged with nitrogen, 700 ml of purified decane, 10 g of commercially available MgCl₂, 24.2 g of ethanol, and 3 g of sorbitan distearate were fed to the stirring device. The temperature of the system was elevated with stirring of the contents in the device, and the contents were further stirred at 800 rpm at a temperature of 120° C. for 30 minutes. While stirring, the reaction liquid was then transferred into a glass flask equipped with a stirrer and containing 1 liter of purified decane which was beforehand cooled to −10° C., by the use of a Teflon tube having an inner diameter of 5 mm. The resulting purified suspension was filtered and then well washed with hexane, to obtain a spherical solid (carrier).

Separately, 150 ml of TiCl₄ was introduced into a 400 ml glass container equipped with a stirrer, and to the container was added the above-obtained carrier at room temperature to give a suspension. After the addition was completed, the temperature of the system was elevated to 40° C., and 5.2 mmol of diisobutyl phthalate was added to the system. Then, the temperature of the system was further elevated to 100° C. and the system was kept at the same temperature for 2 hours.

Subsequently, the resulting suspension was separated into a solid portion and a liquid portion. The solid portion was suspended again in 150 ml of TiCl₄ to perform reaction at 120° C. for 2 hours with stirring. The resulting mixture was subjected to hot filtration and then washed with a sufficient amount of purified hexane until no chlorine ion was detected in the filtrate. Thus, a solid titanium catalyst component (B) was obtained. The solid titanium catalyst component (B) contained titanium, magnesium, chlorine and diisobutyl phthalate in amounts of 3.1% by weight, 17% by weight, 58% by weight and 17.3% by weight, respectively.
[Prepolymerization]

The procedure of the prepolymerization in Example 1 was repeated except for using the solid titanium catalyst component (B), to preform prepolymerization of propylene.
[Polymerization]

The procedure of the polymerization in Example 8 was repeated except for using the prepolymerized solid titanium catalyst component (B), to perform polymerization of propylene.

The results are set forth in Table 2.

Comparative Examples 5 & 6

The procedure of the polymerization in Example 8 was repeated except for using only 0.075 mmol of dicyclopentyldimethoxysilane (Comparative Example 5) or only 0.075 mmol of propyltriethoxysilane (Comparative Example 6) in place of two kinds of the silane compounds, to perform polymerization of propylene.

The results are set forth in Table 2.

Comparative Example 7

The procedure of the polymerization in Example 8 was repeated except for using vinyltriethoxysilane in place of dicyclopentyldimethoxysilane, to perform polymerization of propylene.

The results are set forth in Table 2.

Comparative Example 8
[Polymerization]

To a 2-liter autoclave was introduced 750 ml of purified hexane and were then added simultaneously 0.75 mmol of trimethylaluminum, 0.038 mmol of dicyclopentyldimethoxysilane, 0.038 mmol of propyltriethoxysilane and 0.015 mmol (in terms of titanium atom, corresponding to 4.46 mg of the catalyst component [A]) of the prepolymerized product of the catalyst component [A] at room temperature in a propylene atmosphere. After 200N ml of hydrogen was added to the reaction system, the temperature of the system was elevated to 70° C. to perform polymerization of propylene for 2 hours. During the polymerization, the pressure was kept at 7 kg/cm²-G by feeding propylene.

After the polymerization was completed, a slurry containing the resulting polymer was separated into a particulate white polymer and a liquid phase portion by filtration.

The results are set forth in Table 2.

TABLE 2-1

|  | Electron Donor | Polymerization Time (min) | Electron Donor | Polymerization Time (min) |
|---|---|---|---|---|
| Ex. 8 | propyltriethoxysilane | 20 | dicyclopentyldimethoxysilane | 100 |
| Ex. 9 | propyltriethoxysilane | 30 | dicyclopentyldimethoxysilane | 90 |
| Ex. 10 | propyltriethoxyslane | 45 | dicyclopentyldimethoxysilane | 75 |
| Ex. 11 | vinyltriethoxysilane | 20 | dicyclopentyldimethoxysilane | 100 |
| Ex. 12 | propyltriethoxysilane | 20 | di-t-butyldimethoxysilane | 100 |
| Ex. 13 | β-phenethylmethyl-diethoxysilane | 20 | dicyclopentyldimethoxysilane | 100 |
| Ex. 14 | triethylmethoxysilane | 20 | dicyclopentyldimethoxysilane | 100 |
| Ex. 15 | dicyclopentyldimethoxysilane | 60 | propyltriethoxysilane | 60 |
| Ex. 16 | dicyclopentyldimethoxysilane | 60 | diethylvinylmethoxysilane | 60 |
| Ex. 17 | dicyclopentyldimethoxysilane | 60 | triethylmethoxysilane | 60 |

TABLE 2-1-continued

|  | Electron Donor | Polymerization Time (min) | Electron Donor | Polymerization Time (min) |
|---|---|---|---|---|
| Ex. 18 | propyltriethoxysilane | 20 | dicyclopentyldimethoxysilane | 100 |
| Comp. Ex. 5 | dicyclopentyldimethoxysilane | 120 | — | — |
| Comp. Ex. 6 | propyltriethoxysilane | 120 | — | — |
| Comp. Ex. 7 | propyltriethoxysilane | 20 | vinyltriethoxysilane | 100 |
| Comp. Ex. 8 | dicyclpentyldimethoxysilane + propyltriethoxysilane | 120 | — | — |

TABLE 2-2

|  | Extraction Residual Ratio of Boiling Heptane (%) | MFR (g/10 min) | BD (g/cc) | Catalytic Activity (g-pp/mM-Ti) | t-I.I. (%) | Mw/MN |
|---|---|---|---|---|---|---|
| Ex. 8 | 99.2 | 2.2 | 0.42 | 22,600 | 98.9 | 9.83 |
| Ex. 9 | 98.8 | 3.1 | 0.43 | 19,900 | 98.5 | 9.48 |
| Ex. 10 | 98.4 | 4.4 | 0.41 | 18,400 | 98.2 | 8.51 |
| Ex. 11 | 98.8 | 10.5 | 0.42 | 15,300 | 98.6 | 7.82 |
| Ex. 12 | 98.9 | 2.7 | 0.43 | 19,700 | 98.6 | 8.91 |
| Ex. 13 | 98.1 | 10.8 | 0.40 | 19,500 | 97.7 | 8.21 |
| Ex. 14 | 98.3 | 8.8 | 0.39 | 20,700 | 97.9 | 8.55 |
| Ex. 15 | 99.0 | 2.2 | 0.43 | 24,700 | 98.7 | 8.10 |
| Ex. 16 | 98.0 | 5.2 | 0.41 | 20,900 | 97.5 | 7.95 |
| Ex. 17 | 98.7 | 6.0 | 0.42 | 22,600 | 98.4 | 8.43 |
| Ex. 18 | 99.1 | 2.5 | 0.43 | 23,300 | 98.8 | 9.52 |
| Comp. Ex. 5 | 99.4 | 0.5 | 0.45 | 31,100 | 99.2 | 4.08 |
| Comp. Ex. 6 | 97.2 | 19 | 0.45 | 17,300 | 96.5 | 3.88 |
| Comp. Ex. 7 | 95.4 | 28 | 0.42 | 14,000 | 95.1 | 3.74 |
| Comp. Ex. 8 | 99.0 | 1.7 | 0.44 | 22,200 | 98.7 | 7.48 |

What is claimed is:

1. A process for preparing an olefin polymer, comprising the steps of:

preparing an olefin polymer (I) by polymerizing or copolymerizing an olefin in the presence of an olefin polymerization catalyst comprising:

(A) a solid titanium catalyst component containing magnesium, titanium, halogen and an electron donor as essential components, (B) an organoaluminum compound catalyst component, and (C) an electron donor catalyst component, which may be the same as or different from the electron donor of component (A), represented by the following formula (I):

$$R^1_2Si(OR^2)_2 \qquad (I)$$

wherein $R^1$ is an alkyl, cycloalkyl, cycloalkenyl or aryl group, which may be substituted with substituent groups containing halogen, silicon, oxygen, nitrogen, sulfur, phosphorus or boron, whose carbon atom adjacent to Si is a secondary or tertiary carbon atom, and $R^2$ is a hydrocarbon group;

preparing an olefin polymer (II) by polymerizing or copolymerizing an olefin in a polymerizer different from that for the polymerization of the above step in the presence of an olefin polymerization catalyst comprising:

(A) a solid titanium catalyst component containing magnesium, titanium, halogen and an electron donor as essential components, (B) an organoaluminum compound catalyst component, and (D) an electron donor catalyst component, which may be the same as or different from the electron donor of component (A), represented by the following formula (II):

$$R^1_n Si(OR^2)_{4-n} \qquad (II)$$

wherein n is 1, 2, or 3, when n is 2, one of $R^1$ is an alkyl or alkenyl group, which may be substituted with substituent groups containing halogen, silicon, oxygen, nitrogen, sulfur, phosphorus or boron, whose carbon atom adjacent to Si is a primary carbon atom, and the other of $R^1$ is an aralkyl group, which may be substituted with substituent groups containing halogen, silicon, oxygen, nitrogen, sulfur, phosphorus or boron, whose carbon atom adjacent to Si is a primary carbon atom, when n is 1 or 3, $R^1$ is an alkyl or alkenyl group, which may be substituted with substituent groups containing halogen, silicon, oxygen, nitrogen, sulfur, phosphorus or boron, whose carbon atom adjacent to Si is a primary carbon atom, and $R^2$ is a hydrocarbon group; and then, polymerizing or copolymerizing an olefin in a polymerizer containing the resulting olefin polymer (I) and the resulting olefin polymer (II).

2. A process for preparing an olefin polymer, comprising the steps of:

polymerizing or copolymerizing an olefin in the presence of an olefin polymerization catalyst comprising:

(A) a solid titanium catalyst component containing magnesium, titanium, halogen and an electron donor as essential components, (B) an organoaluminum compound catalyst component, and (C) an electron donor catalyst component (I), which may be the same as or different from the electron donor of component (A), which is a member selected from the group consisting of dicyclopentyldimethoxysilane and di-t-butyldimethoxysilane; and then continuing polymerizing or copolymerizing said olefin with addition of (D) an electron donor catalyst component (II), which may be the same as or different from the electron donor of component (A), which is a member selected from the group consisting of propyltriethoxysilane and vinyltriethoxysilane.

3. A process for preparing an olefin polymer comprising the steps of:

polymerizing or copolymerizing an olefin in the presence of an olefin polymerization catalyst comprising:

(A) a solid titanium catalyst component containing magnesium, titanium, halogen and an electron donor, (B) an organoaluminum compound catalyst component, and (C) an electron donor catalyst component, which may be the same as or different from the electron donor of component (A), represented by the following formula (I):

$$R^1{}_2Si(OR^2)_2 \tag{I}$$

wherein

R$^1$ is an alkyl, cycloalkyl, cycloalkenyl group, which may be substituted with substituent groups containing halogen, silicon, oxygen, nitrogen, sulfur, phosphorus or boron, whose carbon atom adjacent to Si is a secondary or tertiary carbon atom, and R$^2$ is a hydrocarbon group; and then continuing polymerizing or copolymerizing said olefin with addition of (D) an electron donor catalyst component, which may be the same as or different from the electron donor of component (A), represented by the following formula (II):

$$R^1{}_nSi(OR^2)_{4-n} \tag{II}$$

wherein n is 1, 2, or 3, when n is 2, one of R$^1$ is an alkyl or alkenyl group, which may be substituted with substituent groups containing halogen, silicon, oxygen, nitrogen, sulfur, phosphorus or boron, whose carbon atom adjacent to Si is a primary carbon atom, and the other of R$^1$ is an aralkyl group, which may be substituted with substituent groups containing halogen, silicon, oxygen, nitrogen, sulfur, phosphorus or boron, whose carbon atom adjacent to Si is a primary carbon atom, when n is 1 or 3, R$^1$ is an alkyl or alkenyl group, which may be substituted with substituent groups containing halogen, silicon, oxygen, nitrogen, sulfur, phosphorus or boron, whose carbon atom adjacent to Si is a primary carbon atom, and R$^2$ is a hydrocarbon group.

4. The process as claimed in claim 3, wherein the electron donor represented by the formula (I) is dicyclopentyldimethoxysilane or di-t-butyldimethoxysilane.

5. The process as claimed in claim 3, wherein the electron donor represented by the formula (II) is propyltriethoxysilane or vinyltriethoxysilane.

6. The process for preparing an olefin polymer of claim 3, wherein in (D) the electron donor catalyst component (II) is a member selected from the group consisting of diethylvinylmethoxysilane and triethylmethoxysilane.

7. The process according to claim 2 or 6 wherein the olefin polymer obtained has a wide molecular weight distribution of Mw/Mn of 8 to 10.

8. A process for preparing an olefin polymer, comprising the steps of:

conducting a first polymerization by polymerizing or copolymerizing an olefin in the presence of an olefin polymerization catalyst comprising:

(A) a solid titanium catalyst component containing magnesium, titanium, halogen and an electron donor as essential components, (B) an organoaluminum compound catalyst component, and (D) an electron donor catalyst component, which may be the same as or different from the electron donor of component (A), represented by the following formula (II):

$$R^1{}_nSi(OR^2)_{4-n} \tag{II}$$

wherein n is 1, 2, or 3, when n is 2, one of R$^1$ is an alkyl or alkenyl group, which may be substituted with substituent groups containing halogen, silicon, oxygen, nitrogen, sulfur, phosphorus or boron, whose carbon atom adjacent to Si is a primary carbon atom, and the other of R$^1$ is an aralkyl group, which may be substituted with substituent groups containing halogen, silicon, oxygen, nitrogen, sulfur, phosphorus or boron, whose carbon atom adjacent to Si is a primary carbon atom, when n is 1 or 3, R$^1$ is an alkyl or alkenyl group, which may be substituted with substituent groups containing halogen, silicon, oxygen, nitrogen, sulfur, phosphorus or boron, whose carbon atom adjacent to Si is a primary carbon atom, and R$^2$ is a hydrocarbon group; and then polymerizing or copolymerizing an olefin in the presence of the product of the first polymerization with addition of (C) an electron donor catalyst component, which may be the same as or different from the electron donor of component (A), represented by the following formula (I):

$$R^1{}_2Si(OR^2)_2 \tag{I}$$

wherein

R$^1$ is an alkyl, cycloalkyl, cycloalkenyl or aryl group which may be substituted with substituent groups containing halogen, silicon, oxygen, nitrogen, sulfur, phosphorus or boron, whose carbon atom adjacent to Si is a secondary or tertiary carbon atom, and R$^2$ is a hydrocarbon group.

* * * * *